July 17, 1951 M. MENNESSON 2,560,883
DEVICE FOR MEASURING OR CHECKING A TRANSVERSE
DIMENSION IN A PIECE OF INDEFINITE LENGTH
Filed May 13, 1949 3 Sheets-Sheet 1

INVENTOR
MARCEL MENNESSON
BY
Bailey, Stephens & Huettig
ATTORNEYS

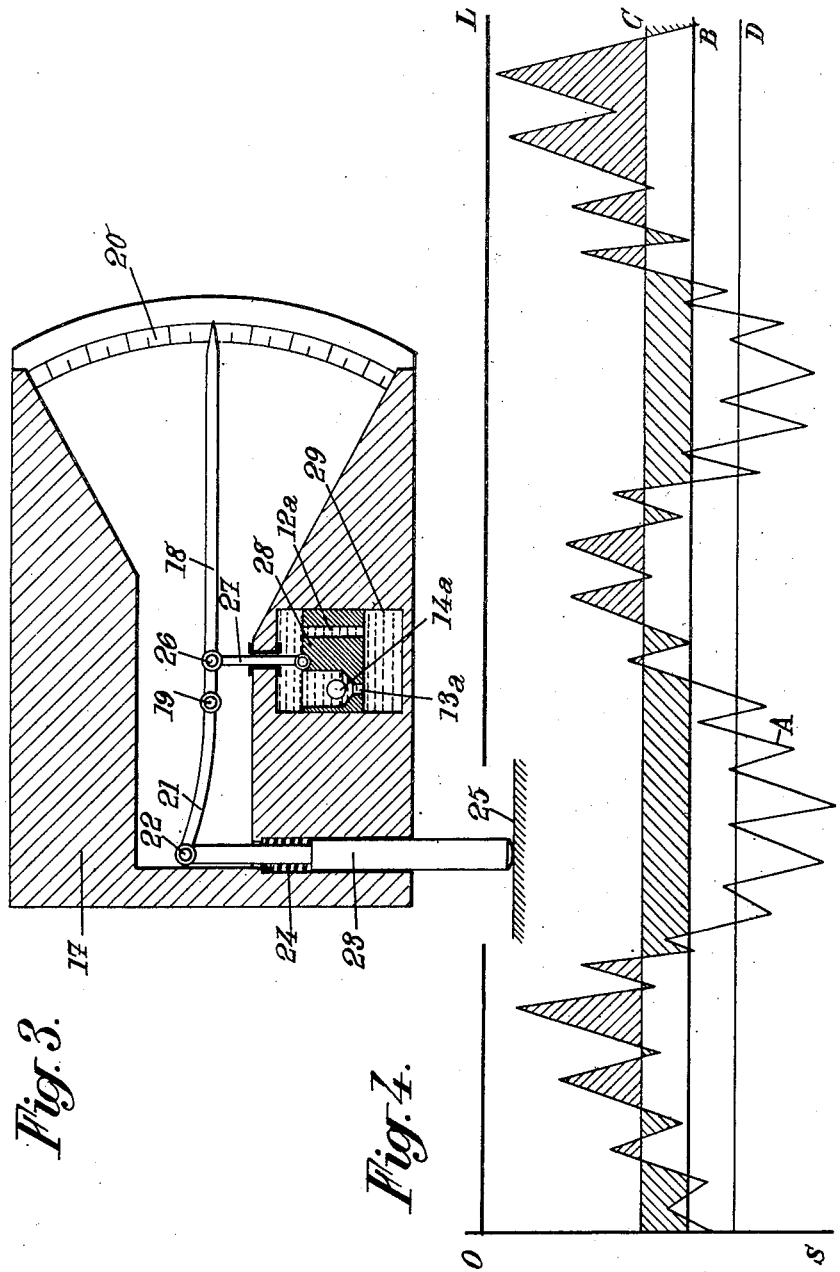

Patented July 17, 1951

2,560,883

UNITED STATES PATENT OFFICE 2,560,883

DEVICE FOR MEASURING OR CHECKING A TRANSVERSE DIMENSION IN A PIECE OF INDEFINITE LENGTH

Marcel Mennesson, Neuilly-sur-Seine, France, assignor to Societe d'Applications et de Constructions pour Materiel Automobile (S. A. C. M. A.) S. A. R. L., Neuilly-sur-Seine, France, a society of France Application May 13, 1949, Serial No. 93,174
In France June 26, 1948

4 Claims. (Cl. 73—37.5)

The present invention relates to devices for measuring or checking a transverse dimension in a piece of indefinite length, for instance the thickness or the cross section of a wick or of a wire, of a textile material or a metal respectively, which passes in a continuous manner and in the longitudinal direction, through a measurement apparatus.

The chief object of my invention is to provide a device of this kind which permits of obtaining quickly and by mere reading on a graduated scale, the mean value of the dimension to be measured, its variations more or less with respect to its mean value or again the extreme maximums and minimums of the curve representing the variations of the dimension measured at different points of the length of the piece.

Measurement of these variations may be performed, for instance, by means of a pneumatic micrometer of the kind described in the U. S. Patent No. 1,985,576, but it can also be effected through other measurement apparatus, of the hydraulic, electric, mechanical or other types.

The invention consists chiefly in subjecting the indicating means (manometric column, fluid flow, pointer) of the measurement apparatus that is used to the action of means capable of damping the displacements of said indicating means in at least one direction, damping being obtained through the intervention of a fluid which passes through at least one suitably dimensioned throttled passage and owing to a relative movement taking place between said fluid and the piece in which said throttled passage is provided.

Preferred embodiments of the present invention will be hereinafter described with reference to the accompanying drawings, given merely by way of example and in which:

Figs. 1 to 3 show, in diagrammatic vertical section, respectively, three different embodiments of the invention;

Fig. 4 shows, in the form of a diagram, the variations that may occur in the dimensions of the cross section of a thread of a textile material.

Figure 1:
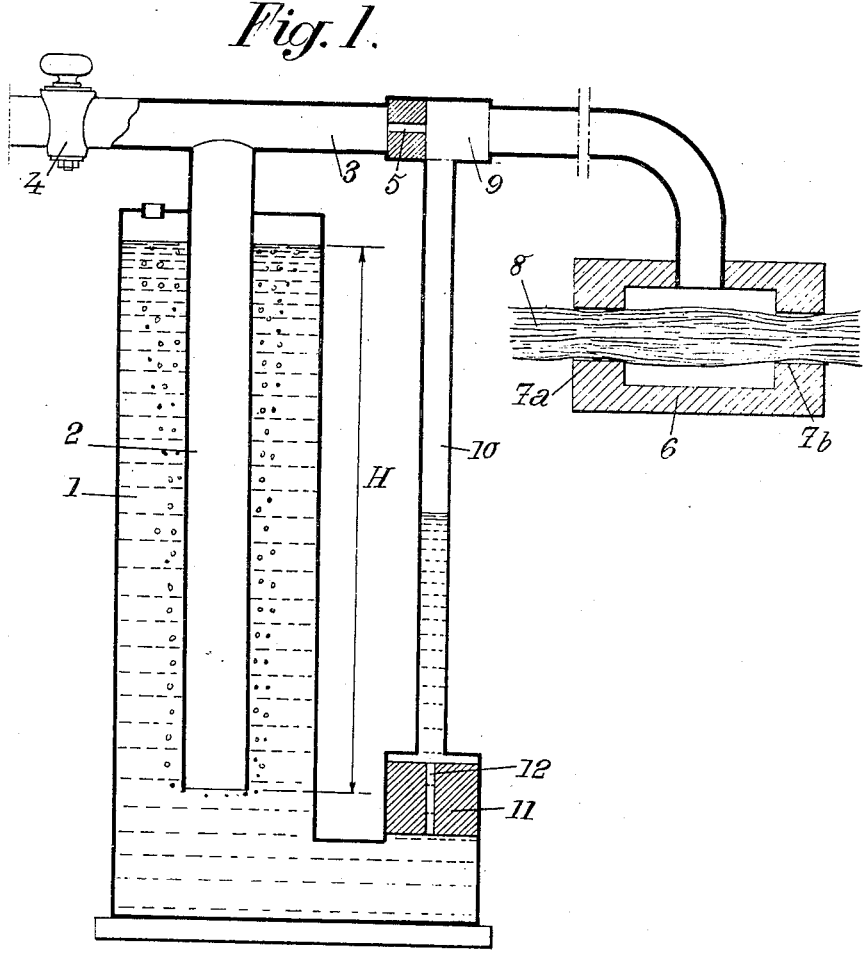
Figure 2:
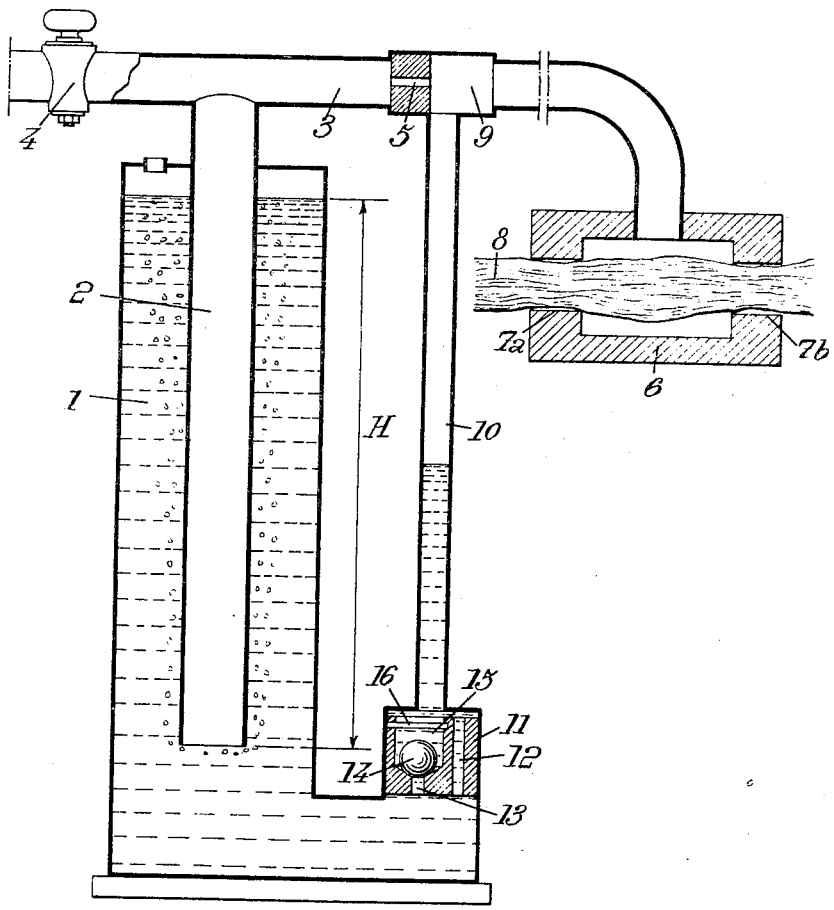

For the embodiments shown by Figs. 1 and 2, it has been assumed that the measurements are made by means of a pneumatic micromeasurement apparatus analogous to those described in the above mentioned U. S. patent.

This apparatus essentially includes a tank 1, containing a liquid such as water and open to the atmosphere. In this liquid is immersed a tube 2 in communication with a conduit 3 into which air is admitted under any suitable pressure. This conduit is provided with an adjustment cock 4 and a calibrated orifice 5 and it leads to a hollow box 6 in the opposite walls of which are provided two circular and coaxial holes 7a and 7b the section of which is such that it permits the passage, without tight contact, of the wick 8 (or other part) the transverse dimensions of which are to be measured, which wick is driven by means not illustrated in a continuous manner through orifices 7a and 7b. These means are constituted, for instance, as indicated in the U. S. Patents No. 1,971,271 and No. 2,026,187. Tank 1 and tube 2 form together a pressure regulating system owing to which the air pressure in conduit 3 is kept at a constant mean value equal to the height H (H grammes, if the liquid contained in tank 1 is water) over which tube 2 is immersed in the liquid. The excess of air escapes from the lower end of tube 2 and ascends, in the form of bubbles to the surface of the liquid.

Calibrated orifice 5 opens into a chamber 9 which belongs to conduit 3 and with which is connected a pressure gauge 10 which measures the pressure existing in the portion of conduit 3 between orifice 5 and box 6. It is known that this pressure varies in accordance with the clearance between the edges of orifices 7a and 7b and the periphery of wick 8, which permits of deducing the value of the dimension to be measured from the value of the pressure indicated by pressure gauge 10 on a suitable scale.

Advantageously, pressure gauge 10 is constituted by a tube connected to the lower portion of tank 1 and opening into chamber 9.

If the textile wick 8 is caused to pass at a certain rate through the orifices 7a and 7b of box 6 and if the values read on the pressure gauge are plotted on a diagram (Fig. 4) where abscissae correspond to the lengths L of the wick and ordinates to the values S of the cross sections thereof, the values of these sections being indicated below axis OL and the negative ordinate increasing when the section increases, I obtain a curve A representing the variations of this section. Fig. 4 shows that this curve includes groups of sawteeth the amplitudes of which are very different and the distances of which from axis OL are variable. It is thus difficult to be able to ascertain the approximative mean value of the cross section.

The present invention permits of remedying this drawback by damping these variations in such manner that at least those of the second order no longer influence the pressure gauge reading, whereby this reading becomes more stable at a limit level about which only very small variations are registered, which variations can, in first approximation and for usual curves, be considered as being equal to zero.

This limit level therefore gives the mean section of the textile wick that is being considered and may be represented by a substantially horizontal line B (Fig. 4) the ordinate of which corresponds to the mean value of the cross section of the wick or thread that is being measured. Being given this section it is possible to calculate the weight per metre of the wick or to know the numeral of the thread.

In order to obtain this effect and as shown on Fig. 1, I provide, at the lower end of manometric tube 10, a piece 11 in which is formed a throttled passage 12 and the wick is made to pass through orifices 7a and 7b at the same rate as above. As manometric tube 10 no longer communicates with the external portion of tank 1 through a large passage but through a more or less reduced passage 12, liquid can no longer flow up and down through this tube as easily as before and can no longer follow in a sufficiently quick and accurate manner the secondary variations of pressure, which not only causes the saw-teeth of curve 4 to disappear but also eliminates the undulated shape thereof.

The free level of the liquid then becomes substantially stable at a point which approximately gives the horizontal line B of Fig. 4.

I can also determine the mean variation more or less of the measurements made on a wick or a wire with respect to its mean section which, on the diagram of Fig. 4, corresponds for instance to a straight line C substantially parallel to horizontal line B and which, in the case of the determination of a mean variation in less, is nearer to the axis of abscissae OL than line B and at such a distance therefrom that the sum of the areas hatched in one direction and limited by curve A between lines B and C is equal to that of the areas hatched in the other direction and located beyond line C on the side of axis OL.

For this purpose I provide, as shown by Fig. 2, in piece 11 and parallel to passage 12, a second passage 13 fitted with a check valve, for instance a ball 14 housed in a recess provided in this piece. This ball is preferably of a density substantially equal to that of the liquid that is used and a pin 16 prevents it from escaping from the recess. In the example shown, ball 14 is moved away from its seat when it is subjected to the thrust of the liquid from tank 1 through passage 13, that is to say when the liquid has a tendency to ascend through manometric tube 10 due to a drop of the pressure in conduit 3 on the downstream side of calibrated orifice 5. Liquid can therefore flow in a relatively easy way through both of the passages 12 and 13. On the contrary, upon a rise of this pressure, ball 14 is applied upon its seat and liquid can move down in tube 10 only through passage 12, whereby the free level of the manometric column gets stabilized at a level higher than that of the mean value, with very small oscillations, which can be considered as negligible. The value that is obtained is then represented by a straight line parallel to horizontal line B and if the dimensions of passages 12 and 13 are suitably chosen this straight line can come to coincide with line C.

By giving passage 12 a very small diameter and passage 13 a relatively larger diameter, it is possible to obtain a curve (not shown) the maximum point, or points, of which correspond to the points where the wick or thread is of the smallest section and where it therefore risks breaking.

By arranging the check valve 14 so that it opens in the opposed direction (toward the tank), I obtain an indication relating to the areas of curve A located below horizontal line B on Fig. 4, which permits, for instance, of determining a line D symmetrical of C, representing the amount of material used in excess for the manufacture of a wick or thread supposed to be of a given size. Likewise, the maximums or minimums of curve A can easily be determined by giving suitable dimensions to passages 12 and 13.

The lowest minimum and the highest maximum can be obtained by stopping passage 12 and leaving only passage 13, with its check valve 14, the opening of which then takes place in the suitable direction, as above explained.

Passages 12 and 13 might quite as well be provided at the upper part of manometric tube 10 so as thus to obtain damping of the variations of the air pressure acting upon the manometric column.

Fig. 3 shows an application of the invention to a mechanical measurement apparatus.

In a casing 17, there is mounted a rigid pointer 18, rotatable about a pivot 19 and the free end of which runs along a circular graduated dial 20. Beyond pivot 19, the pointer carries a perfectly elastic arm 21 the free end of which is hinged, about an axis 22, to a contact member 23 subjected to the action of a return spring 24. This contact member is intended to bear upon the piece 23 to be measured. At an intermediate point 26, pointer 18 is connected, through a link 27, with a piston 28 housed in a cylinder 29, which contains a liquid (oil for instance) and fluidtightness of which, at the point where link 27 passes, is ensured for instance by suitable packing means.

As in the above examples, I may provide in piston 28, either a free passage 12a (without check valve), or a passage 13a with a check valve 14a opening in one direction or the other, or again two passages analogous to 12a and 13a, and the same effects as above mentioned are obtained. The only difference is that in these preceding examples, the fluid is moving and piece 11 remains stationary whereas, in this case, piston 28 moves and the fluid merely passes from one chamber of cylinder 29 to the other.

A device analogous to that of Fig. 3 may be used with a mechanical pressure gauge, for instance one of the Bourdon type.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for measuring or checking a transverse dimension of a piece of indefinite length which comprises, in combination, a pneumatic measurement apparatus including a closed chamber having an inlet and at least one outlet aperture, said outlet aperture being shaped and dimensioned to correspond with a predetermined play to said dimension of said piece so as to permit the continuous passage of said piece through said outlet aperture, means for feeding a gas under pressure to the inlet of said chamber, including a calibrated orifice, liquid tank means arranged to cooperate with said gas feeding means for keeping at a constant value the pressure of said gas on the upstream side of said calibrated orifice, a liquid column pressure gauge for measuring the pressure of said gas on the downstream side of said orifice, and a part provided with a passage of restricted section interposed between the bottom of said pressure gauge and said tank means below the liquid level therein so as to slow down the displacements of said liquid column in communication with said tank means through said passage, said part being further provided with a second passage extending therethrough, and a check valve in said second mentioned passage.

2. A device according to claim 1 in which said check valve consists of a ball of a material the density of which is at least substantially equal to that of the liquid.

3. A device according to claim 1 in which the first mentioned passage is made of a relatively small diameter with respect to that of the second passage.

4. A device according to claim 1 in which the part provided with the passages is located at the bottom part of the pressure gauge liquid column and the check valve opens toward said liquid column.

MARCEL MENNESSON.

REFERENCES CITED

The following references are of record in the file of this patent:

UNITED STATES PATENTS

| Number | Name | Date |
| --- | --- | --- |
| 1,854,094 | Aschenbach | Apr. 12, 1932 |
| 2,019,066 | Balsiger | Oct. 29, 1935 |
| 2,077,525 | Mennesson | Apr. 20, 1937 |

FOREIGN PATENTS

| Number | Country | Date |
| --- | --- | --- |
| 402,008 | Great Britain | Nov. 23, 1933 |